3,816,503
PROCESS FOR PREPARING CYANOETHYLATED KETONES

Edward van Poelvoorde, Beek, Limburg, and Hendrikus van der Zalm, Geleen, Netherlands, assignors to Stamicarbon N.V., Heerlen, Netherlands
No Drawing. Filed Sept. 19, 1972, Ser. No. 290,360
Claims priority, application Netherlands, Sept. 29, 1971, 7113332
Int. Cl. C07c 121/02, 121/16, 121/46
U.S. Cl. 260—464
7 Claims

ABSTRACT OF THE DISCLOSURE (2-cyanoethyl)-ketones are prepared by liquid phase reaction of acrylonitrile and a ketone without the undesirable formation of polymer-like materials by maintaining the amount of oxygen in the liquid reaction mixture below about 20 p.p.m. according to the process disclosed. An inert gas is bubbled into the reaction area and optionally into one or both of the reactants prior to introduction into the reaction area.

BACKGROUND OF THE INVENTION

The present invention relates to a process for preparing (2-cyanoethyl)-ketones by liquid-phase reaction of acrylonitrile and a ketone at a temperature of 50°–250° C. in the presence of an acid or an acid compound and in the presence of a primary amine and/or a Schiff base as catalyst, as is known from U.S. Pat. No. 2,850,519, in the name of Krimm, the disclosure of which is hereby incorporated by reference.

According to this process mono-(2-cyanoethyl)-ketones can be prepared in good yield, while at the same time, a di-(2-cyanoethyl)-ketone can then be prepared as a by-product. This, of course, depends on the nature of the ketone, the reaction conditions and the acrylonitrile to ketone ratio used. The mono-(2-cyanoethyl)-ketones are themselves valuable intermediate products for various organic syntheses. For instance, by saponification of the cyano group, ketocarboxylic acids are obtained which are useful in the preparation of plastics. By hydrogenation in the presence of ammonia cyclic compounds can be obtained which are of importance to the pharmaceutical industry, such as 2-methyl-piperidine from mono-(2-cyanoetheyl)-acetone.

A recognized problem in the art relating to the continuous process of the reaction of acrylonitrile and a ketone in stirred reactors is that polymer-like compounds have been found to deposit on the stirrer and on the wall of the reactors, particularly if the reaction is performed at a temperature above 135° C. In practice this means that the apparatus has to be taken out of operation regularly for removal of the polymer-like deposits, which, of course, necessarily increases the cost price of the product so produced. In principle, by carrying out the reaction below 135° C., depositing of a polymer-like substance can be reduced, but this involves the disadvantage that the reaction speed becomes much too slow and, in various cases, that the efficiency is influenced adversely.

A different method to avoid formation of undesirable polymers is in the use of an inhibitor. The usual quantities of various known inhibitors, such as hydrochinone, methyl-ether of hydrochinone, β-aminopropionitrile and methylene blue, have in the past appeared to be insufficient. Results were only achieved if a very large quantity of inhibitor was applied. However, the use of a large amount of inhibitor is extremely expensive and presents problems in processing the reaction mixture thus obtained.

DETAILED DESCRIPTION OF THE INVENTION

We have now found that in the reaction of acrylonitrile and a ketone formation of polymers can be substantially reduced and, at the same time, a higher yield can be obtained by decreasing the oxygen content of the reaction mixture. Apparently the small quantity of oxygen normally present in the reaction mixture, which varies from 25 to 50 parts by weight per million, gives rise to the undesirable formation of a polymer. This discovery of the effect of oxygen is particularly remarkable and unexpected because it is known from the literature that in the polymerization of acrylonitrile the presence of a small quantity of oxygen has an inhibiting effect (see Houben-Weyl, Methoden der Organischen Chemie, vol. XIV/1, 1961, pp. 974–975, the disclosure of which is hereby incorporated by reference).

The process according to the present invention is characterized in that the reaction mixture that is used has an oxygen content of less than 20 parts by weight per million.

A reaction mixture having an oxygen content of less than 20 parts by weight per million (hereinafter p.p.m.) can be achieved by passing an inert gas, such as nitrogen through the reaction mixture. By inert is meant a gas that does not interfere with the reaction as it proceeds yet removes sufficient quantities of oxygen. Other gases that may be used are carbon dioxide, ammonia, hydrogen, carbon monoxide, argon and xenon. In this manner the oxygen content can be decreased from the normal value of greater than 25 p.p.m. to, for instance, a value of 20 p.p.m., or even less, preferably of the order of about 5 p.p.m. or lower. The desired low oxygen content of the reaction mixture can also be achieved by decreasing the oxygen content of the reagents supplied to the reactor, for in stance, by passing nitrogen or another inert gas through the ketone and/or the acrylonitrile components prior to introduction into the reaction zone. It is also possible to render the starting materials substantially free from oxygen by distillation.

In the process according to the present invention various primary amines and/or Schiff bases may be applied as catalysts, for instance, lower alkyl amines having from 1 to 6 carbon atoms such as methylamine, ethylamine, n-propylamine, isopropylamine, n-butylamine, isobutylamine, secondary butylamine, secondary pentylamine and/or the Schiff bases of these amines with the ketone to be converted. The quantity of catalyst may be varied but for practical purposes an amount of 0.01 to 0.25 mole of catalyst per mole of acrylonitrile to be converted will suffice, although higher and lower amounts may be used. In addition to the catalyst a small amount of acid or acid compound should be present in the reaction mixture. For this purpose both organic and inorganic acids are suitable, as illustrated by acetic acid, benzoic acid, adipic acid, hydrochloric acid, phosphoric acid and sulphuric acid. The use of catalysts and/or acid compounds in the reaction of acrylonitrile and a ketone to produce (2-cyanoethyl)-ketones is well known, for example, U.S. Pat. No. 2,850,519 the disclosure of which is hereby incorporated by reference.

According to the present invention various ketones can be converted with acrylonitrile, for instance, ketones having the general formula:

wherein R and $R^1$ are the same or different lower alkyl groups having from 1 to 5 carbon atoms, or wherein R and $R^1$ together with the carbonyl carbon atom represent a cycloalkyl group having from 4 to 12 carbon atoms in the ring, the said ketone having at least one hydrogen atom in α-position. Examples of such ketones are acetone, methyl-ethylketone, methyl-propylketone, diethylketone, methyl-isopropylketone, cyclopentanone, cyclohexanone and 2-methyl-cyclohexanone.

The acrylonitrile to ketone ratio may be varied according to the present invention depending on the products desired. For instance, if it is desired to limit the formation of the di-cyanoethylated product, a molar ratio of acrylonitrile to ketone equal to or lower than 1:1 will be used.

In the process according to the present invention the temperature may also be varied. For a sufficiently rapid reaction and a good yield temperature in the range of about 150° to 230° C. are the most suited although temperatures from 50° to 250° C. are also useful. The pressure is not critical as such, but should be chosen at least so high, with respect to the temperature, that the reaction mixture is present as a liquid. Generally speaking, pressures of at least 3 atm., e.g. about 20 atm. will be used, although higher and lower pressures may also be employed depending, of course, on the temperature employed.

In the process according to the invention the ketone and/or the acrylonitrile reactants can be converted either wholly or partly. After the desired conversion has been achieved, the reaction mixture can be separated by distillation, in which, in addition to the desired product, a fraction rich in catalyst can be obtained which is conveniently recirculated.

The invention will further be described in more detail in the following illustrative examples.

EXAMPLE 1

A stainless steel reactor having a volume of 0.7 liter and being provided with a stirrer was charged with acetone (713 g.), acrylonitrile (169 g.) and a catalyst-containing mixture (42 g.) composed of 14.9% by weight of isopropylamine, 1% by weight of benzoic acid dissolved in 84.1% by weight of acetone. The above amounts were fed into the reactor on an hourly basis. Thereafter the reaction mixture was successively passed through two more reactors of the same type. The reaction mixture in the reactors kept under a nitrogen pressure of 20 atmospheres, while the temperature of the reaction mixture was maintained at approximately 180° C. by external heating of each of the reactors. The nitrogen employed was virtually free of oxygen (content below 1 p.p.m. of oxygen) and, as a result, the oxygen content of the acetone supplied to the reactor had decreased from 50 to 1.5 p.p.m. In the reactors the oxygen content of the reaction mixture was measured and found to amount to about 2 p.p.m. After having passed through the last reactor the reaction mixture was cooled and allowed to expand to atmospheric pressure. 924 grams of reaction mixture were obtained per hour. The reaction mixture contained 17% by weight of 4-oxocapronitrile, 9% by weight of acrylonitrile and 70% by weight of acetone; the conversion of the acrylonitrile amounted to 51% and that of the acetone to 14%. The 4-oxocapronitrile yield amounted to 87% referred to the acrylonitrile converted and to 81% referred to the acetone converted.

The test was terminated after 24 hours and the reactors inspected. After careful visual inspection it appeared that no solid substance had deposited.

Subsequently the test as described above was repeated for 24 hours without decreasing in any the oxygen content of the acetone, all other conditions being the same. In this case the 4-oxocapronitrile yield amounted to 81% referred to the acrylonitrile converted and to 75% referred to the acetone converted. The conversion of the acrylonitrile amounted to 35% and that of the acetone to 9%. The average oxygen content of the reaction mixture amounted to approximately 50 p.p.m. About 18 grams of a solid polymer-like substance was found to have been deposited in the reactors.

EXAMPLE 2

In the same manner as Example 1 methylethylketone was reacted with acrylonitrile. The reactor was charged, on an hourly basis, with methyl-ethylketone (577 g.), acrylonitrile (140 g.) and a catalyst-containing mixture (215 g.) composed of 14.5% by weight of isopropylamine, 1.5% by weight of benzoic acid dissolved in 84% by weight of methylethylketone. The oxygen content of the methyl-ethylketone had been decreased, prior to introduction into the reactor by bubbling a sufficient volume of nitrogen therethrough, from 30 p.p.m. measured prior to introduction into the reactor to 1 p.p.m. after treatment; the oxygen content of the entire reaction mixture amounted to approximately 2 p.p.m. The reaction was conducted at 180° C. and at a pressure to about 20 atm.

932 grams of reaction mixture were produced per hour and contained 28% by weight of 4-methyl-5-oxohexane nitrile, 3% by weight of 5-oxo-heptanenitrile, 1.4% by weight of acrylonitrile and 62% by weight of methylethylketone. The conversion of the acrylonitrile amounted to 91% and that of the ketone to 24%. 87% of the acrylonitrile consumed and 85% of the ketone consumed had been converted into 4-methyl-5-oxohexanenitrile.

The test was terminated after 24 hours and the reactors inspected. Formation of solid substances in the reactors was not observed. The test was then repeated in the same manner but with methyl-ethylketone whose oxygen content had not been decreased. After the same period of time, 24 hours, approximately 20 grams of a solid polymer-like substance had formed and the oxygen content of the reaction mixture amounted to about 30 p.p.m.

EXAMPLE 3

In the same manner as in Example 1, cyclohexanone was reacted with acrylonitrile. Every hour cyclohexanone (554 g.), acrylonitrile (231 g.) and a catalyst-containing mixture (106 g.) composed of 12.6% by weight of isopropylamine, 1.3% by weight of benzoic acid dissolved in 86.1% by weight of cyclohexanone) were supplied to the reactor. The oxygen content of the cyclohexanone had been decreased, prior to introduction into the reactor, from 25 p.p.m. to 1 p.p.m. by bubbling sufficient nitrogen therethrough. The oxygen content of the reaction mixture amounted to approximately 2 p.p.m. and was maintained under a nitrogen pressure of about 20 atmospheres, while the temperature of the reaction mixture was about 150° C. 891 grams of reaction mixture were discharged from the last reactor per hour, which contained 56% by weight of 2-(2-cyanoethyl)-cyclohexanone, 1.2% by weight of acrylonitrile and 28% by weight of cyclohexanone. The conversion of the acrylonitrile amounted to 95% and that of the cyclohexanone to 61%. The 2-(2-cyanoethyl)-cyclohexanone yield amounted to 79% referred to the acrylonitrile converted and to 82% referred to the cyclohexanone converted. The test was terminated after 24 hours. Formation of solid substance was not found.

The above test was repeated with cyclohexanone whose oxygen content had not been decreased. Such an amount of a solid polymer-like substance was formed that the apparatus became completely clogged after 5 hours and the test had be terminated.

We claim:
1. In a process for preparing a (2-cyano-ethyl)-ketone having at least one cyanoethyl group in the α-position comprising reacting, in liquid phase at a temperature of about 50°–250° C.,
   acrylonitrile, and
   a ketone of the formula:

wherein R and R¹ are the same or different lower alkyl groups having from 1 to 5 carbon atoms or wherein R and R¹ together with the carbonyl carbon atom represent a cycloalkyl group having from 4 to 12 carbon atoms in the ring; said ketone reactant having at least one hydrogen atom in the α-position; said reaction conducted in the presence of an acid and a lower alkylamine having 1 to 6 carbon atoms, the Schiff base of said amine or mixtures thereof as a catalyst present in an amount from 0.01 to 0.25 mole of catalyst per mole of acrylonitrile, the improvement comprising maintaining the liquid reaction mixture at a dissolved oxygen content less than about 20 parts by weight per million parts of said reaction mixture.

2. The process according to claim 1 wherein the oxygen content of the reaction mixture is less than about 5 p.p.m.

3. The process according to claim 1 wherein an inert gas is passed through the reaction mixture.

4. The process according to claim 1 where an inert gas is passed through the acrylonitrile prior to introducing the acrylonitrile into the reaction mixture.

5. The process according to claim 1 wherein an inert gas is passed through said ketone prior to introducing the ketone into the reaction mixture.

6. The process according to claim 1 wherein the reaction is conducted at a temperature in the range of about 150°–230° C.

7. The process according to claim 6 wherein the reaction is conducted in a nitrogen atmosphere.

References Cited
UNITED STATES PATENTS 2,850,519    9/1958    Krimm ........... 260—465.1 X JOSEPH P. BRUST, Primary Examiner U.S. Cl. X.R.

260—465.1, 465.8 R